United States Patent
Piper et al.

(10) Patent No.: US 10,662,847 B2
(45) Date of Patent: May 26, 2020

(54) INTEGRATED START/STOP AND AFTER-TREATMENT CONTROLS

(71) Applicant: Cummins Inc., Columbus, IN (US)

(72) Inventors: Erik L. Piper, Columbus, IN (US); Robert Edward Cochran, Columbus, IN (US); John P. O'Brien, Columbus, IN (US)

(73) Assignee: Cummins Inc., Columbus, IN (US)

( * ) Notice: Subject to any disclaimer, the term of this patent is extended or adjusted under 35 U.S.C. 154(b) by 49 days.

(21) Appl. No.: 15/918,424

(22) Filed: Mar. 12, 2018

(65) Prior Publication Data

US 2018/0202341 A1   Jul. 19, 2018

Related U.S. Application Data

(63) Continuation of application No. PCT/US2015/050392, filed on Sep. 16, 2015.

(51) Int. Cl.
*F01N 3/20* (2006.01)
*F02N 11/08* (2006.01)
(Continued)

(52) U.S. Cl.
CPC ........... *F01N 3/208* (2013.01); *F01N 3/2066* (2013.01); *F02D 41/0235* (2013.01);
(Continued)

(58) Field of Classification Search
CPC .. F01N 3/2066; F01N 3/208; F01N 2560/021; F01N 2560/026; F01N 2560/06;
(Continued)

(56) References Cited

U.S. PATENT DOCUMENTS

| | | |
|---|---|---|
| 6,895,744 B2 | 5/2005 | Osawa |
| 7,751,984 B2 | 7/2010 | Dietz |

(Continued)

FOREIGN PATENT DOCUMENTS

JP    2005083306 A  *  3/2005

OTHER PUBLICATIONS

Search Report and Written Opinion, PCT Appln. No. PCT/US15/50392, dated Jan. 7, 2016, 11 pgs, Jan. 7, 2016.

(Continued)

*Primary Examiner* — Audrey K Bradley
(74) *Attorney, Agent, or Firm* — Taft Stettinius & Hollister LLP (57) ABSTRACT

An apparatus and method for controlling engine start/stop operations based at least in part on considerations relating to the thermal management of an exhaust gas after-treatment system. A control system may monitor and/or predict conditions and/or properties of the after-treatment system, including conditions related to the thermal management of a selective catalytic reduction system and the properties of an exhaust gas stream that has been released from an internal combustion engine and into the after-treatment system. Such conditions may be evaluated in determining whether the thermal management of the after-treatment system is at, or will be in, a condition that may accommodate a start/stop operation of the internal combustion engine with minimal, if any, adverse impact on the thermal management of the after-treatment system. Such an evaluation may, in at least certain situations, provide at least a consideration as to whether to de-activate or activate start/stop operations.

18 Claims, 3 Drawing Sheets

(51) Int. Cl.
*F02D 41/02* (2006.01)
*F02D 41/14* (2006.01)

(52) U.S. Cl.
CPC ..... *F02D 41/1446* (2013.01); *F02D 41/1461* (2013.01); *F02N 11/0829* (2013.01); *F01N 2560/021* (2013.01); *F01N 2560/026* (2013.01); *F01N 2560/06* (2013.01); *F01N 2610/02* (2013.01); *F01N 2900/1602* (2013.01); *F01N 2900/1616* (2013.01); *F01N 2900/1626* (2013.01); *F02D 2041/0265* (2013.01); *Y02T 10/24* (2013.01); *Y02T 10/48* (2013.01)

(58) Field of Classification Search
CPC ........ F01N 2610/02; F01N 2900/1602; F01N 2900/1616; F01N 2900/1626; F02N 11/0829; F02D 41/0235; F02D 41/1446; F02D 41/1461; F02D 2041/0265; Y02T 10/24; Y02T 10/48
See application file for complete search history.

(56) References Cited

U.S. PATENT DOCUMENTS

| | | |
|---|---|---|
| 8,528,319 B2 | 9/2013 | Wilhelm |
| 2006/0086080 A1 | 4/2006 | Katogi et al. |
| 2009/0165442 A1* | 7/2009 | Hara .................. B01D 53/9409 60/286 |
| 2010/0006078 A1 | 1/2010 | Shoda |
| 2010/0038158 A1 | 2/2010 | Whitney et al. |
| 2010/0043404 A1 | 2/2010 | Hebbale et al. |
| 2011/0072792 A1 | 3/2011 | Bidner et al. |
| 2011/0202253 A1* | 8/2011 | Perry .................. B01D 53/9477 701/102 |
| 2012/0173062 A1 | 7/2012 | Kumar et al. |
| 2012/0208672 A1* | 8/2012 | Sujan .................... B60W 10/02 477/5 |
| 2012/0271535 A1* | 10/2012 | Gamberoni ............. F02D 28/00 701/110 |
| 2013/0111878 A1 | 5/2013 | Pachner et al. |
| 2013/0111905 A1 | 5/2013 | Pekar |
| 2013/0226380 A1* | 8/2013 | Ando .................... B60W 10/06 701/22 |
| 2013/0283769 A1* | 10/2013 | Watanabe ............... F01N 3/208 60/274 |
| 2015/0075490 A1* | 3/2015 | Hull ...................... F02D 41/029 123/320 |
| 2015/0252770 A1 | 9/2015 | Books et al. |

OTHER PUBLICATIONS

Chinese Office Action from Counter Chinese Application, CN Serial No. 201580083145.5, 9 pgs., dated Mar. 9, 2020.

* cited by examiner

INTEGRATED START/STOP AND AFTER-TREATMENT CONTROLS

CROSS-REFERENCE TO RELATED APPLCIATION

The present application is a continuation of International Patent App. No. PCT/US15/50392 filed on Sep. 16, 2015, the disclosure of which is hereby incorporated herein by reference in its entirety.

BACKGROUND

The present invention generally relates to integrating the controls for engine start/stop operations with the controls for exhaust gas after-treatment systems. More particularly, embodiments of the present invention relate to controlling engine start/stop operations based at least in part on the thermal management of an exhaust gas after-treatment system.

Start/stop controls are often configured to utilize opportunities to stop an engine of a vehicle so as to at least attempt to reduce fuel consumption, and thus reduce fuel costs, while also mitigating emissions. Existing start/stop controls often use certain engine conditions, such as, for example, engine coolant temperature, ambient conditions, and engine battery levels to limit start/stop operations for the purpose of engine protection and operator comfort.

Selective catalytic reduction systems (SCR) typically are configured to provide one or more catalyst elements that, with the aid of a reductant, convert nitrogen oxides ($NO_x$) in exhaust gases into nitrogen ($N_2$) and water. The efficiency of chemical reactions by an SCR catalyst may depend on a variety of different factors, including, for example, at least on the properties of the exhaust gas, such as, for example, an inlet temperature and/or velocity of the exhaust gas steam that enters into the SCR. Further, such properties of the exhaust gas stream, and moreover the efficiency of the after-treatment system, may change based on a variety of different factors, such as, for example, operating conditions, including, but not limited to, ambient conditions, engine load, duration of periods of engine idling, and engine temperatures when an engine is stopped and/or re-started by a start/stop operation, among other factors. As a consequence, under such operating conditions, the emissions released from the after-treatment system may, at times, exceed a target, or regulation specified, amount.

In many leading exhaust gas emission markets, emission transparency is a requirement for obtaining dedication certification. Yet, existing start/stop control strategies generally do not take into account the impact start/stop operations may have on the thermal management of the after-treatment system, and moreover the impact start/stop operations may have on exhaust gas emissions. For example, existing start/stop control strategies typically do not take into account modern SCR controls and systems. Further, by not taking into account at least SCR controls and systems, existing start/stop controls may be unable to demonstrate emission transparency as, again, is required by at least some exhaust gas emission markets.

BRIEF SUMMARY

An aspect of an embodiment of the present invention is a method that includes releasing, from an internal combustion engine, an exhaust gas stream into an exhaust gas after-treatment system. The method may also include managing one or more thermal properties of the exhaust gas after-treatment system and inhibiting start/stop operations of the internal combustion engine based on a status of the managed one or more thermal properties of the exhaust gas after-treatment system.

Another aspect of an embodiment of the present invention is a method that includes managing one or more thermal properties of an exhaust gas after-treatment system and determining a status of the managed one or more thermal properties. Additionally, the determined status may indicate a condition of the exhaust gas after-treatment system. Further, start/stop operations of an internal combustion engine may be inhibited based on at least the determined status of the managed one or more thermal properties of the exhaust gas after-treatment system.

Another aspect of an embodiment of the present invention is an apparatus that includes an engine system having an internal combustion engine, the engine system being in fluid communication with an exhaust gas after-treatment system. The apparatus further includes a controller that is coupled to the engine system. The controller may include an exhaust gas after-treatment control module and a start/stop control module. The exhaust gas after-treatment control module may be structured to manage one or more thermal conditions of the exhaust gas after-treatment system. Further, the start/stop control module may be structured to manage one or more start/stop operations of the internal combustion engine. Additionally, the start/stop control module may be structured to inhibit the managed one or more start/stop operations based on at least a condition of the one or more thermal conditions of the exhaust gas after-treatment system.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of"

followed by a list of two or more items, such as "A, B or C," means any individual one of A, B or C, as well as any combination thereof.

Figure 1:
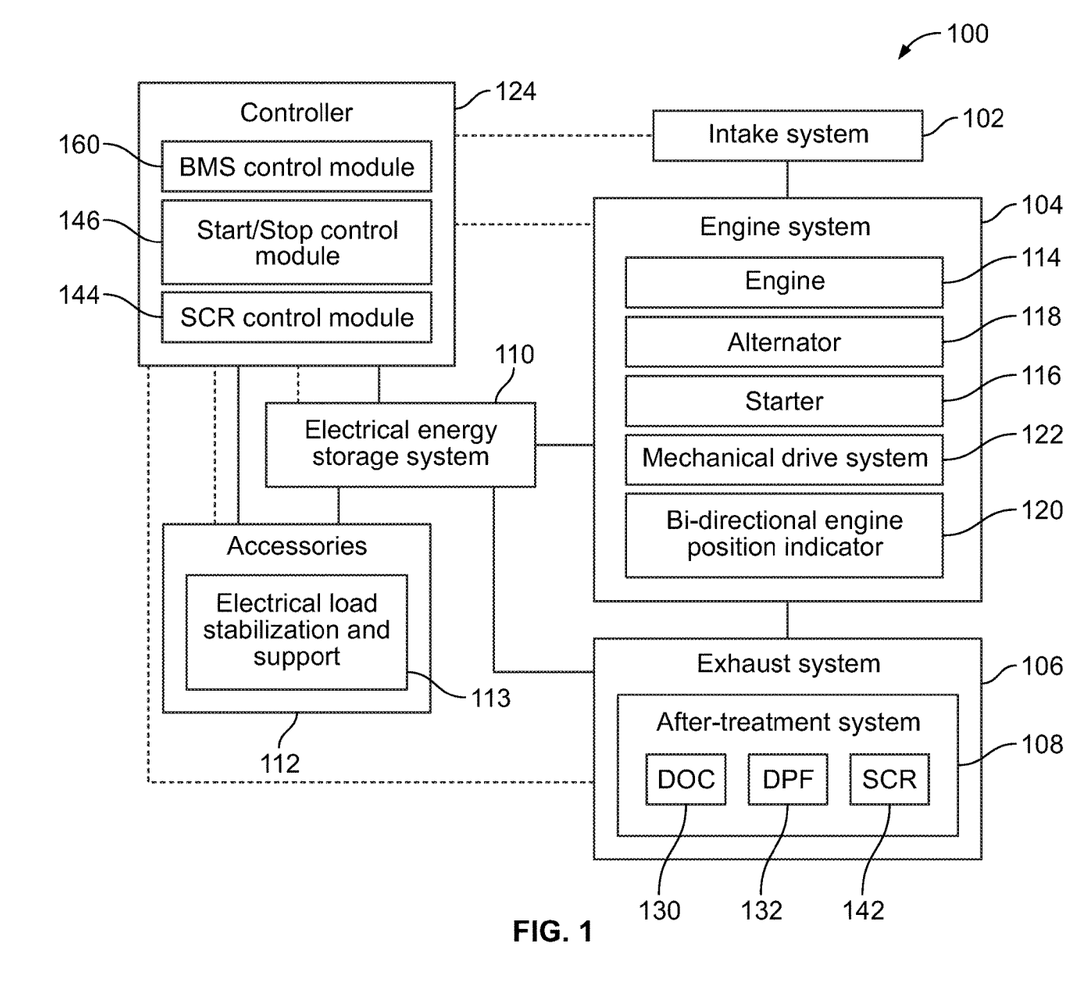
FIG. 1 is a schematic representation of a vehicle system.

FIG. 1 is a schematic representation of a vehicle system 100 having an intake system 102, an engine system 104, an exhaust system 106 having an exhaust gas after-treatment system 108, an electrical energy storage system 110, and a variety of accessories 112, among other components. It shall be appreciated that the illustrated configuration and components of the vehicle system 100 are but one example, and that the disclosure contemplates that a variety of different vehicle systems and the associated components may be utilized. Further, a variety of engines 114 may be used with the engine system 104, such as, for example, internal combustion engines. Further, according to certain embodiments, the engine system 104 may include a relatively robust starter 116 and a smart alternator 118 that are configured to accommodate stop/start operations and/or duty cycles, as well as generally maintain reliable operation over the life of the vehicle system 100. Further, the engine system 104 may include a bi-directional engine position indicator 120, which may be utilized to determine at least the position and/or direction of travel of a crank shaft of the mechanical drive system 122 of the engine system 104. Further, information sensed and/or determined by the bi-directional engine position indicator 120 may be provided to a control system having a controller 124, and more specifically, to a start/stop control module 146 of the controller 124 in connection with controlling start-stop operations of the engine system 104.

The engine 114 of the engine system 104 may be fueled by a liquid fuel, such as, for example, diesel fuel or gasoline, and/or by a gaseous fuel, such as natural gas, bio-gas, methane, propane, ethanol, producer gas, field gas, liquefied natural gas, compressed natural gas, or landfill gas. However, other types of liquid and gaseous fuels are not precluded. Operation of the engine 114 may cause the rotational movement of the crank shaft, which may be operably connected to a drive train that is used by the mechanical drive system 122 in the delivery of power to wheels of the associated vehicle.

The intake system 102 may be configured to deliver an air flow, such as, for example, a charged air flow to an intake manifold 111 (FIG. 2) of the engine 114. According to certain embodiments, the intake system 102 may also be used in the delivery of fuel to the engine 114, such as, for example, the gaseous fuel. The exhaust system 106 may be configured for the delivery of at least a portion of an exhaust gas stream 126 that is generated at least in part by the operation of the engine 114 through the exhaust system 106 and to a tailpipe for subsequent release from the vehicle system 100.

According to the illustrated embodiment, the electrical energy storage system 110 may include a power storage device that provides stored electrical power to the vehicle system 100, including electrical power to accessories 112 that are part of, or operably connected to, the vehicle system 100, such as, for example, an electrical load stabilization and support 113, including a DC-to-DC convertor. A variety of different types of power storage devices may be used, including, for example, one or more electrochemical batteries, super-capacitors, or ultra-capacitors. Additionally, the electrical energy storage system 110 may be operably connected to a motor/generator system.

Figure 2:
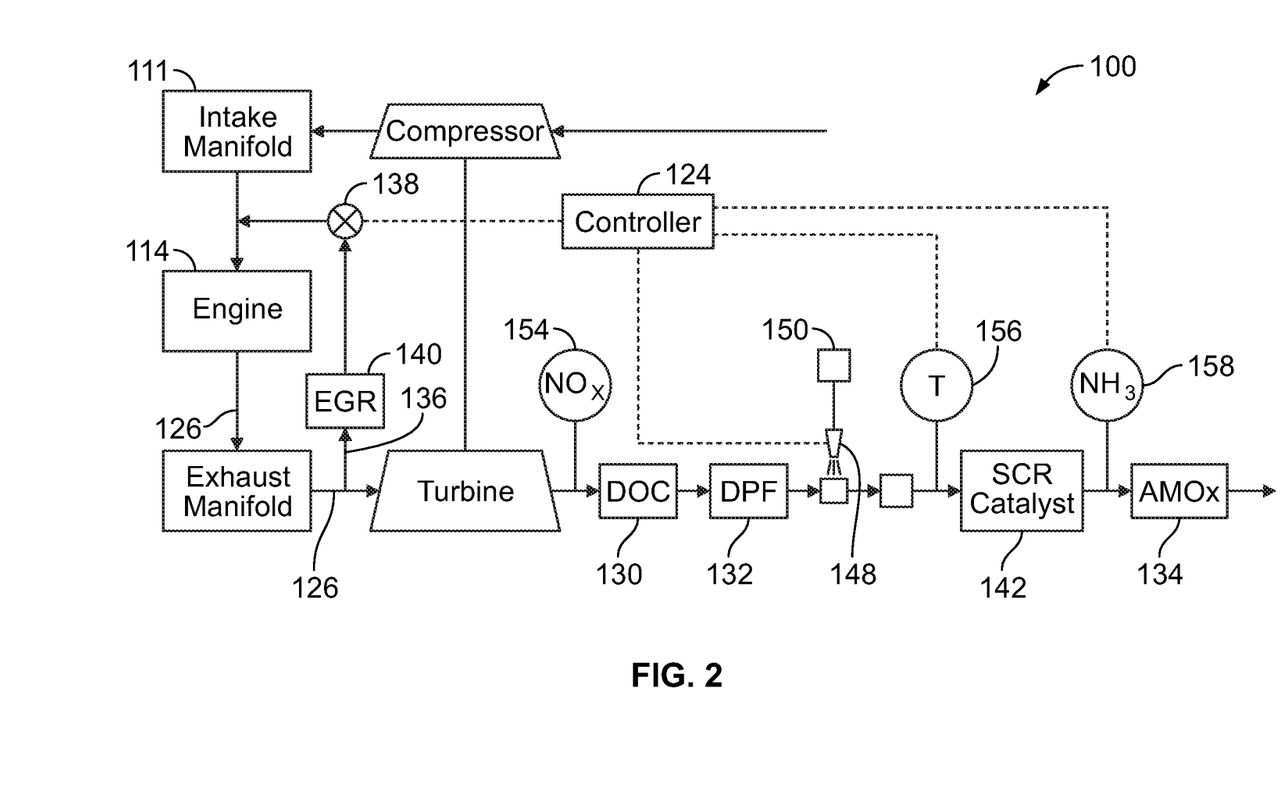
FIG. 2 illustrates a block diagram of exemplary vehicle system that includes an exhaust system having an after-treatment system that includes a selective catalytic reduction system.

Referencing FIGS. 1 and 2, according to certain embodiments, the exhaust system 106 is configured for the treatment of at least a portion of the exhaust gas stream 126, such as, for example, treatment relating to the removal or reduction of nitrogen oxide ($NO_x$) and particulates in the exhaust gas stream 126, and/or the recirculation of the exhaust gas stream 126 to the intake system 102 or intake manifold 111 of the engine 114. According to certain embodiments, the after-treatment system 108 may include, but is not limited to, an exhaust gas recirculation system (EGR) 128, a oxidation catalyst (DOC) 130, a particulate filter, such as, for example, a diesel particulate filter (DPF) 132, and/or one or more ammonia oxidation catalysts ($AMO_x$) 134. As shown in FIG. 2, according to certain embodiments, the EGR 130 may include an exhaust flow path 136, an EGR valve 138, and an EGR cooler 140. According to such an embodiment, the EGR 130 may be configured to recirculate at least a portion of the exhaust gas stream 126, which may be cooled by the EGR cooler 140, to an intake side of the engine 114, such as, for example, the intake system 102 and/or the intake manifold 111.

The after-treatment system 108 further may include a selective catalytic reduction (SCR) system 142 that is configured to provide one or more SCR catalyst components 152 that, with the aid of a reductant, convert nitrogen oxides ($NO_x$) in the exhaust gas stream 126 into nitrogen ($N_2$) and water. According to certain embodiments, the SCR system 142 includes a reductant injector or doser 148 and one or more SCR catalyst components 152. The reductant doser 148 is in fluid communication with a reductant source 150, and may be controllable by the controller 124. The reductant source 150 may contain a reductant, such as, for example, ammonia ($NH_3$), urea, and/or a hydrocarbon, that is supplied for injection by the reductant doser 148 into the exhaust gas stream 126 at a position upstream of the SCR catalyst component 152. The controller 124 may be configured to both determine a ratio of reductant to $NO_x$ in the exhaust gas stream 126, such as, for example, an ammonia to $NO_x$ ratio (ANR) during operation of the engine 114, and to adjust the operation of the reductant doser 148 to achieve a target reductant to $NO_x$ ratio.

The one or more SCR catalyst components 152 are configured to at least assist in the reductant reacting with $NO_x$ to reduce the amount of $NO_x$ in the exhaust gas stream 126. Further, according to certain embodiments, the after-treatment system 108 may include at least one engine-out $NO_x$ sensor 154 that may detect a $NO_x$ level in the exhaust gas stream 126 upstream of the SCR system 142. In the illustrated embodiment, one or more of the engine-out $NO_x$ sensors 154 may be positioned upstream of the DOC 130, the DPF 132, and/or the reductant doser 148. Further, according to the illustrated embodiment, the engine-out $NO_x$ sensor 154 may provide a signal for the controller 124 that indicates, and/or is used in determining, a level of $NO_x$ in the exhaust gas stream 126 at a location upstream of the reductant doser 148. Alternatively, the quantity of engine-out $NO_x$ may be modeled, calculated from an engine operation map, and/or measured from a different location than the location of the engine-out $NO_x$ sensors 154 shown in FIG. 2.

The after-treatment system 108 may also include at least one temperature sensor 156 that is in communication with the controller 124. The temperature sensor 156 may be any suitable device, including but not limited to a thermocouple, thermistor, and pyrometer. Further, the SCR inlet exhaust gas temperature and/or the temperature of the SCR catalyst component 152 may be determined in a variety of different manners, including, for example, at least by utilizing a weighted average of temperature sensors 156 that are positioned upstream and downstream of the SCR catalyst component 152, or modeling and/or estimating the temperature of the SCR catalyst component 152 based upon other temperature measurements available in the engine system 104, and more specifically within the after-treatment system 108. Further, the temperature sensor 156 may be used to determine an inlet temperature of the exhaust gas stream 126, such as, for example, the temperature of the exhaust gas stream 126 that is upstream of the SCR system 142, at or around an inlet of the SCR system 142, and/or is positioned to detect the temperature of one or more SCR catalyst components 152. Further, one or more temperature sensors 156 may be positioned downstream of the SCR catalyst component 152. Additionally, according to certain embodiments, the after-treatment system 108 may further include an ammonia ($NH_3$) sensor 158, which may detect a level(s) of ammonia present in exhaust gas stream 126 that is being exhausted or otherwise released from the engine system 104.

The controller 124, which may be configured to control various operational aspects of vehicle system 100, may be implemented in a number of ways. Further, the controller 124 may execute operating logic that defines various control, management, and/or regulation functions. The operating logic may be in the form of one or more microcontroller or microprocessor routines stored in a non-transitory memory, dedicated hardware, such as a hardwired state machine, analog calculating machine, various types of programming instructions, and/or other forms as would occur to those skilled in the art.

Additionally, the controller 124 may be provided as a single component, or a collection of operatively coupled components, and may comprise digital circuitry, analog circuitry, or a hybrid combination of both of these types. When of a multi-component form, the controller 124 may have one or more components remotely located relative to the others in a distributed arrangement. The controller 124 can include multiple processing units arranged to operate independently, in a pipeline processing arrangement, in a parallel processing arrangement, or the like. In one embodiment, the controller 124 includes several programmable microprocessing units of a solid-state, integrated circuit type that are distributed throughout the vehicle system 100 that each includes one or more processing units and non-transitory memory. For the depicted embodiment, the controller 124 includes a computer network interface to facilitate communications using standard Controller Area Network (CAN) communications or the like among various system control units. It should be appreciated that the depicted modules or other organizational units of the controller 124 refer to certain operating logic performing indicated operations that may each be implemented in a physically separate controller of the controller 124 and/or may be virtually implemented in the same controller.

The description herein including modules and/or organizational units emphasizes the structural independence of the aspects of the controller 124, and illustrates one grouping of operations and responsibilities of the controller 124. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the controller 124 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The controller 124 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

As shown in FIG. 1, the controller 124 is operably connected to a variety of components of the vehicle system 100, including, for example, the electrical energy storage system 110, the engine system 104, the after-treatment system 108, and/or various accessories 112, among other systems and components of the vehicle system 100. Such connections may allow for the communication of information, data, and/or commands between the controller 124 and components of the vehicle system 100 that are used in connection the operation and performance of the vehicle system 100, including, but not limited to, control of start/stop operations, as well as thermal management of the after-treatment system 108.

According to the illustrated embodiment, the controller 124 is structured to functionally execute operations of the engine system 104, such as, for example, operations relating to a start/stop operations of the engine system 104, the operation of the after-treatment system 108, such as, for example, the SCR system 142, and/or the operation of an electrical energy or battery management system (BMS) control module 160. For example, an exemplary controller 124 may include one or more SCR control modules 144, including, for example, a system conditions module, a $NO_x$ modeling module, a $NO_x$ reference module, a $NO_x$ error determination module, a $NO_x$ control module, and/or a doser control determination module.

The engine start/stop control module 146 may be adapted to control engine 114 start events and engine stop events based on a variety of different conditions and/or constraints, including, for example, constraints that indicate whether the engine start/stop control module 146 is enabled or otherwise disabled from initiating a stop or start event based on past, current, and/or predicted conditions or events. A number of forms or implementations of the engine start/stop control module 146 are contemplated. The engine start/stop control module 146 may be adapted to perform a number of operations and tasks, including, for example, determining whether actual or predicted conditions of the vehicle system 100, including, for example, the engine 114, accessories 112, and/or electrical energy storage system 110, meet certain criteria for the initiation, suspension, and/or termination of automatic engine start or automatic engine stop commands from the engine start/stop control module 146.

According to certain embodiments of the present invention, start/stop operations may be inhibited or otherwise at least temporarily deactivated based, at least in part, on considerations relating to the thermal management of the after-treatment system 108, such as, for example, thermal management of the SCR system 142. For example, according to certain embodiments, based on current and/or predicted conditions, parameters, and/or events, the SCR control module 144 may provide information and/or instructions to the start/stop control module 146 that may result in the start/stop control module 146 inhibiting and/or deactivating start/stop operations. Alternatively, according to certain embodiments, based on information received or detected by the start/stop control module 146 relating to thermal management of the after-treatment system 108 and/or the SCR system 142, the start/stop control module 146 may determine to inhibit or at least temporarily deactivate start/stop operations. Further, the duration during which start/stop operations are inhibited or deactivated may vary. For example, according to certain embodiments, start/stop operations may be inhibited or deactivated for a predetermined time period, such as, for example, a time period as measured by a timer of the controller 124. According to other embodiments, the start/stop control module 146 and/or the SCR control module 144 may provide and/or detect a signal indicating that thermal management conditions or parameters are at suitable levels for commencement, re-activation or continuation of start/stop operations.

A variety of information, as well as evaluation of a combination of such information, may be utilized as thermal management parameters in connection with the thermal management of the after-treatment system 108, and moreover utilized in connection with the determination of whether or not to at least temporarily inhibit or deactivate start/stop operations. For example, according to certain embodiments, one or more operating conditions or parameters relating to the thermal management of the after-treatment system 108 may relate to at least attempting to optimize $NO_x$ conversion by the SCR system 142. For example, $NO_x$ conversion efficiency of the SCR systems 142 may be adversely impacted when the inlet temperature of the exhaust gas stream 126 entering into the SCR system 142 and/or the temperature of the SCR catalyst component 152 is/are below certain temperatures. Accordingly, in at least certain situations, execution of a stop event by the start/stop control module 146 that stops operation of the engine 114 may delay elevating the temperature(s) of the exhaust gas stream 126, and thereby adversely impact the $NO_x$ conversion efficiency of the SCR system 142. Thus, according to certain embodiments, the thermal management parameters may include the inlet temperature of the exhaust gas stream 126 entering into the SCR system 142 and/or the temperature of the SCR catalyst component 152. Moreover, according to certain embodiments, the thermal management parameters utilized in the thermal management of the after-treatment system 108, and thus the controlling of start/stop operations, may include predicted, detected, and/or measured $NO_x$ conversion efficiencies, as well as other controlled parameters or operations of the after-treatment system 108, such as, for example, operations relating to ammonia slippage.

Thermal management parameters may also include scheduled or predicted events in the after-treatment system 108. For example, according to certain embodiments, thermal management conditions, as they relate to at least start/stop functions, may not favor de-activation of start/stop operations when an event is scheduled and/or predicted to occur in the after-treatment system 108. Such events may include, for example, fuel injection events relating to regenerating trapped sulfur compounds from an $NO_x$ absorber ($deSO_x$), injection events that elevate the temperature of the exhaust gas stream 126 so as to combust soot in the DPF 132, and/or fuel injection events related to $deNO_x$ regeneration, among other events. Additionally, thermal management parameters may also include scheduled or predicted timing of ammonia dosing into the exhaust gas stream 126 by the reductant doser 148.

Additionally, according to certain embodiments, thermal management parameters may be utilized in determining whether certain emission standards may be compromised by initiating, or altering, a start/stop operation. For example, according to certain embodiments, the controller 124, such as, for example, the SCR control module 144 and/or the start/stop control module 146, may be configured to predict the thermal management impact of a start/stop operation on the ability of at least the after-treatment system 108 to treat pollutants in the exhaust gas stream 126 to a degree or level in which the vehicle system 100 complies with one or more emission standards or regulations. Further, the controller 124, such as, for example, the SCR control module 144 and/or the start/stop control module 146, may determine whether execution of a start/stop operation may impact one or more aspects of the thermal management of the after-treatment system 108 in a manner that may cause at least some thermal management parameters to fall outside certain levels or ranges to a degree that may, or may not, adversely impact the ability of the vehicle system 100 to comply with one or more emission market standards. For example, according to certain embodiments, the controller 124 may determine whether a start/stop operation may result in the $NO_x$ released from the exhaust system being, or not being, within a particular range that corresponds to Federal emission standards.

Additionally, according to certain embodiments, thermal management of the after-treatment system 108 may indicate when a start/stop operation should be initiated. For example, according to certain embodiments, in connection with thermal management of the after-treatment system 108, the SCR control module 144 may indicate to the start/stop control module 146 that a start/stop operation that stops the engine 114 should be initiated so as to prevent damage to the SCR system 142, such as, for example, damage that is associated with generally excessive exhaust gas stream 126 temperatures. Further, according to certain embodiments, the SCR control module 144 may indicate to the start/stop control module 146 that an engine 114 that has been stopped by a start/stop operation should, based on thermal management of the after-treatment system 108, be re-started. Such re-starting of the engine 114 by a start/stop operation may be due to a number of factors that influence the thermal management of the after-treatment system 108, such as, for example, the temperature of the exhaust gas stream 126 and/or of the SCR catalyst of the SCR catalyst component 152 dropping below a certain temperature level or range.

Requests from the SCR control module 144 to the start/stop control module 146 to either inhibit or activate start/stop operations may be a factor, among others, considered by the start/stop control module 146 in determining whether or not to de-activate or activate start/stop operations. For example, in certain situations, the start/stop control module 146 may receive a request from the SCR control module 144 that, based on thermal management of the after-treatment system 108, start/stop operations be inhibited. However, during such situations, the start/stop control module 146 may also receive other information from other parts of the vehicle system 100, such as engine coolant temperature and/or information from the electrical energy or battery management system (BMS) control module 160, that indicates a start/stop operation of the engine 114 should be activated. Thus, the controller 124, including, for example, the start/stop control module 146, may include a hierarchy structure that prioritizes information and/or commands relating to activation and deactivation of start/stop operations in connection with determining whether to inhibit start/stop operations.

Figure 3:
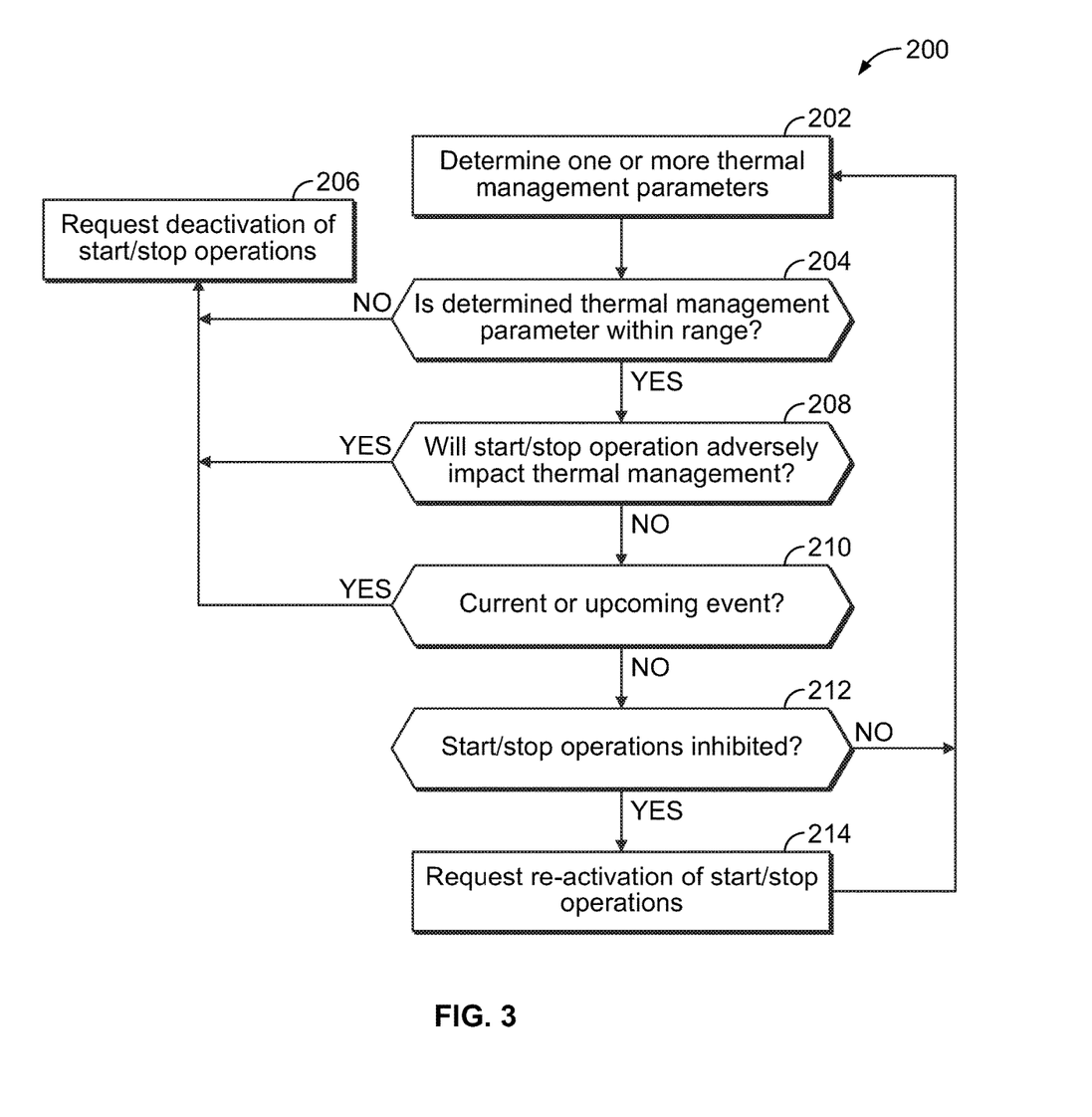
FIG. 3 illustrates a flow diagram of an exemplary process for controlling start/stop operations of a vehicle system based at least in part on the thermal management of an exhaust gas after-treatment system.

FIG. 3 illustrates a flow diagram of an exemplary process 200 for controlling start/stop operations of a vehicle system 100 based at least in part on the thermal management of an exhaust gas after-treatment system 108. The operations illustrated for all of the processes in the present application are understood to be examples only, and operations may be combined or divided, and added or removed, as well as re-ordered in whole or in part, unless explicitly stated to the contrary. At step 202, one or more thermal management properties may be determined. The determination of thermal management properties may be achieved in a number of manners, including, but not limited to, via detection of pollutants, temperature(s), pressure(s), and/or flow velocities of the exhaust gas stream 126 through the use of, for example, $NO_x$ sensors 154, temperature sensors 156, and/or ammonia sensors 158. Further, the determination of thermal management properties may also include a determination or prediction by the SCR control module 144 of one or more thermal management properties, such as, for example, determinations that utilized sensed data or information, algorithms, and/or look-up or reference tables, to determine or predict $NO_x$ conversion efficiency and/or ammonia slippage, among other determinations.

At step 204, the controller 124, such as, for example, the SCR control module 144, may, in connection with thermal management of the after-treatment system 108, determine whether one or more thermal management properties determined or predicted at step 202 are outside a particular range, and/or whether the after-treatment system 108 is operating in manner that complies with emission standards. For example, the SCR control module 144 may determine, among other determinations, $NO_x$ emission levels, $NO_x$ conversion efficiencies, and/or ammonia slippage levels, as determined at step 202, are within, above, or below predetermined values or levels. If one or more thermal management properties are determined to be outside a particular range or level, the SCR control module 144 may then, at step 206, issue information or a command to the start/stop control module 146 indicating that, based on considerations relating to the thermal management of the after-treatment system 108, start/stop operations should be at least temporarily inhibited or deactivated.

Alternatively, according to certain embodiments, at step 204, the SCR control module 144 may determine that one or more of the thermal management properties are, and/or will be, outside a particular range in a manner in which the SCR control module 144 may request that a start/stop operation be activated. For example, according to certain embodiments, the SCR control module 144 may determine that the temperature of the exhaust gas stream 126, SCR catalyst of the SCR catalyst component 152, and/or other components of the after-treatment system 108 are at temperatures that may cause damage to the after-treatment system 108 and/or to the SCR system 142. In such situations, the SCR control module 144 may issue information or a command that activates start/stop operations that seek to stop operation of an engine 114. Alternatively, the SCR control module 144 may determine that, based on the information detected at step 202, thermal management of the after-treatment system 108 may benefit if a start/stop operation is initiated that re-starts an engine 114 that is in a stopped condition due to a prior start/stop operation. In such situations, according to certain embodiments, the SCR control module 144 may send a request or instructions to the start/stop control module 146, and/or the start/stop control module 146 may determine that a start/stop operation should be initiated.

If the SCR control module 144 determines that one or more thermal management properties are not outside a particular range, then, at step 208, the SCR control module 144 may determine whether a change in start/stop operation status may, within a certain time period, adversely impact the thermal management of the after-treatment system 108. For example, the SCR control module 144 may determine whether, given detected, measured, or predicted temperatures, such as those obtained at step 202, a start/stop operation stopping a running engine 114 may cause the temperature of the exhaust gas stream 126 and/or the SCR catalyst component 152 to subsequently drop below optimum temperatures for $NO_x$ conversion before the engine 114 is subsequently re-started by another start/stop operation. If the controller 124, and more particularly the SCR control module 144, determines that a start/stop operation may adversely impact the thermal management of the after-treatment system 108, then the SCR control module 144 may, at step 206, issue information or a command to the start/stop control module 146 indicating that start/stop operations should be at least temporarily inhibited or deactivated.

At step 210, the controller 124, such as, for example, the SCR control module 144, may also determine that initiation of a start/stop operation at the present time or within an upcoming time frame may adversely impact a current, upcoming, and/or predicted event(s) related to the operation of the after-treatment system 108. For example, at step 210, the controller 124 and/or SCR control module 144 may recognize that one or more fuel injection events and/or the associated effect of such fuel injection events that are utilized for $deSO_x$ regeneration, $deNO_x$ regeneration, and/or de-sooting of the DPF 132 are in process of occurring, or are upcoming, such that a start/stop operation that may stop operation of the engine 114 should not, at least temporarily, be permitted or should otherwise be inhibited. In such an event, the SCR control module 144 may then, at step 206, issue information or a command to the start/stop control module 146 indicating that start/stop operations should be at least temporarily inhibited or deactivated.

At step 212, the controller 124, such as, for example, the SCR control module 144, may determine whether start/stop operations are currently inhibited or de-activated due to thermal management of the after-treatment system 108, such as, for example, based on a prior request from the SCR control module 144 in connection with thermal management of the SCR system 142. If start/stop operations are currently not inhibited and thermal management under current operations and/or parameters may operably accommodate start/stop operations, then the SCR control module 144 may continue to monitor thermal management parameters and events that may otherwise cause a change in the thermal management of the after-treatment system 108. If, however, start/stop operations are currently inhibited or deactivated due to a prior, outdated request from the controller 124, such as, for example, from the SCR control module 144, then at step 214 the start/stop control module 146 may receive from the SCR control module 144 an indication that start/stop operations are no longer to be inhibited for reasons related to the thermal management of the after-treatment system 108.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method comprising:
    releasing, from an internal combustion engine, an exhaust gas stream into an exhaust gas after-treatment system;
    managing one or more thermal properties of the exhaust gas after-treatment system;
    inhibiting one or more start or stop operations of the internal combustion engine based on a status of the managed one or more thermal properties of the exhaust gas after-treatment system; and
    determining an emission property for the exhaust gas stream being released from the exhaust gas after-treatment system, and comparing the determined emission property to a standard emission property, and wherein the status is an indication of a difference between the determined emission property and the standard emission property.

2. The method of claim 1, wherein the step of managing the one or more thermal properties of the exhaust gas after-treatment system comprises managing the execution of one or more regeneration events in the exhaust gas after-treatment system, and wherein the status of the managed one or more thermal properties comprises a timing for execution of one or more regeneration events.

3. The method of claim 1, further including the step of re-activating the one or more start or stop operations of the internal combustion engine based on a change in the status of the one or more thermal properties of the exhaust gas after-treatment system.

4. The method of claim 1, further including the step of detecting one or more characteristics of the released exhaust gas stream.

5. The method of claim 4, wherein the step of managing one or more thermal properties comprises managing, using at least the detected one or more characteristics of the released exhaust gas stream, the operation of a selective catalytic reduction system.

6. The method of claim 5, wherein the status of the managed one or more thermal properties comprises an inlet temperature of the exhaust gas stream in the selective catalytic reduction system relative to a predetermined minimum inlet exhaust gas temperature.

7. The method of claim 5, wherein the status of the managed one or more thermal properties comprises a temperature of a catalyst component of the selective catalytic reduction system relative to a predetermined minimum catalyst component temperature.

8. A method comprising:
    managing one or more thermal properties of an exhaust gas after-treatment system;
    determining a status of the managed one or more thermal properties, the determined status indicating a condition of the exhaust gas after-treatment system; and
    inhibiting one or more start or stop operations of an internal combustion engine based on at least the determined status of the managed one or more thermal properties of the exhaust gas after-treatment system,
    wherein the step of managing one or more thermal properties comprises determining an emission property for an exhaust gas being released from the after-treatment system, and wherein the step of determining the status comprises comparing the determined emission property to a standard emission property, and wherein the status is an indication of differences between the determined emission property and the standard emission property.

9. The method of claim 8, wherein the managed one or more thermal properties comprises one or more regeneration events in the exhaust gas after-treatment system, and wherein the step of determining the status of the managed one or more thermal properties comprises determining a timing for the execution of the one or more regeneration events, and wherein the step of inhibiting the one or more start or stop operations is based at least on the determined timing of the one or more regeneration events.

10. The method of claim 8, wherein the determined emission property is at least one of the following: a $NO_x$ emission value and an ammonia slippage value.

11. The method of claim 8, further including the step of re-activating the one or more start or stop operations of the internal combustion engine based on a change in the status of the managed one or more thermal properties of the exhaust gas after-treatment system.

12. The method of claim 8, wherein the managed one or more thermal properties is a thermal property of a selective catalytic reduction system, and wherein the determined status is a condition of the thermal property relative to a predetermined condition for the thermal property.

13. The method of claim 12, wherein the thermal property comprises an inlet temperature of an exhaust gas stream at an inlet of the selective catalytic reduction system, and wherein the determined status of the managed one or more thermal properties indicates whether the inlet temperature of the exhaust gas stream at the inlet of the selective catalytic reduction system is below a minimum inlet exhaust gas temperature.

14. The method of claim 12, wherein the thermal property comprises a temperature of a catalyst component of the selective catalytic reduction system, and wherein the determined status of the managed one or more thermal properties indicates whether the temperature of the catalyst component is below a predetermined minimum temperature for the catalyst component.

15. An apparatus comprising:
    an engine system having an internal combustion engine, the engine system being in fluid communication with an exhaust gas after-treatment system; and
    a controller coupled to the engine system, the controller having an exhaust gas after-treatment control module and a start/stop control module,
    the exhaust gas after-treatment control module structured to manage one or more thermal properties of the exhaust gas after-treatment system, the start/stop control module structured to manage one or more start or stop operations of the internal combustion engine, and the start/stop control module further structured to inhibit the managed one or more start or stop operations based on at least a condition of the one or more thermal properties of the exhaust gas after-treatment system by determining an emission property for the exhaust gas stream being released from the exhaust gas after-treatment system and comparing the determined emission property to a standard emission property, and wherein the condition is an indication of a difference between the determined emission property and the standard emission property.

16. The apparatus of claim 15, wherein the exhaust gas after-treatment system includes a sensor configured to detect at least one one or more thermal conditions, and wherein the start/stop control module is structured to inhibit the managed one or more start or stop operations based at least on a comparison of the detected at least one thermal condition relative to a predetermined condition value.

17. The apparatus of claim 16, wherein the exhaust gas after-treatment control module is structured to manage one or more thermal conditions of a selective catalytic reduction system.

18. The apparatus of claim 17, wherein the at least one of the managed one or more thermal conditions detected by the sensor is a temperature of an exhaust gas stream, and wherein the predetermined condition value is a predetermined minimum temperature for the exhaust gas stream.

* * * * *